United States Patent [19]

Aronson

[11] 3,824,040
[45] July 16, 1974

[54] FLOATLESS CONTROL OF LIQUID LEVEL, ESPECIALLY USEFUL IN ATOMIZING SYSTEMS

[75] Inventor: David Aronson, Upper Montclair, N.J.

[73] Assignee: Compump Systems, Inc., Newark, N.J.

[22] Filed: Apr. 6, 1972

[21] Appl. No.: 241,745

[52] U.S. Cl................ 417/204, 417/503, 239/127, 55/421, 137/172
[51] Int. Cl..... F04b 23/10, B05b 9/00, B01d 47/00
[58] Field of Search...... 137/171, 172, 173; 55/421; 417/26, 77, 503, 204; 418/15, 83; 239/418, 419, 420, 126, 127

[56] References Cited
UNITED STATES PATENTS

| 815,407 | 3/1906 | Cooper | 55/421 |
|---|---|---|---|
| 2,699,727 | 1/1955 | Getz et al. | 418/15 |
| 2,911,137 | 11/1959 | Edwards | 417/77 |
| 2,918,009 | 12/1959 | Crevoisier | 418/15 |
| 3,283,723 | 11/1966 | Charlson | 418/15 |
| 3,285,180 | 11/1966 | McCallum | 418/15 |
| 3,402,891 | 9/1968 | Clark et al. | 417/204 |
| 3,416,547 | 12/1968 | Gleen | 137/171 |
| 3,565,550 | 2/1971 | Bellmer | 417/204 |
| 3,582,233 | 6/1971 | Bloom | 417/26 |

Primary Examiner—William L. Freeh
Assistant Examiner—Gregory Paul LaPointe

[57] ABSTRACT

A system is provided for regulating the level of output fluid of a pump, which system includes primary pumping means for pumping fluid from a supply source, recycle pumping means for pumping accumulated output fluid, means for combining the fluid output of the primary pumping means and recycle pumping means into a combined fluid output stream, means for accumulating combined fluid output stream, means for restricting said combined fluid output stream whereby pressure variations in the combined fluid output stream can be sensed, and fluid pressure responsive control means responsive to said pressure variations for regulating flow of the combined fluid output stream to the primary pumping means and to the means for accumulating combined fluid output stream. In addition, a system is provided for atomizing a liquid in a gas, such as oil in air, employing the above system for regulating the level of output fluid to a pump.

13 Claims, 7 Drawing Figures

FLOATLESS CONTROL OF LIQUID LEVEL, ESPECIALLY USEFUL IN ATOMIZING SYSTEMS

BACKGROUND OF THE INVENTION

This invention relates to a system for regulating the level of the fluid output of a pump and to a system for atomizing a liquid in a gas, such as oil in air, employing the above system for regulating level of fluid output.

In the operation of low pressure oil burners for dwellings or for commercial structures, fuel is supplied in the form of a fine atomizing spray of oil in air produced in specially designed air-atomizing nozzles. A typical system for supplying such fuel includes: a pump system (such as the pump-compressor combination disclosed in U.S. Pat. No. 3,565,550 to Bellmer, or other pumps or pump-compressor combinations); gas-liquid separation means; and means for atomizing substantially gas-free liquid with substantially liquid-free gas.

The liquid-gas (e.g. oil-air) separation means may take the form of conventional separators known in the art and usually comprises an upper portion containing a high surface area packing material for removing solids and liquids from air, and a lower portion which includes an oil reservoir containing float valve control means responsive to the level of oil in the reservoir, which means will usually comprise a float, actuating linkage and flow control means. The float valve control means avoids undesirable build-up of oil in the reservoir by allowing excess oil to flow out of the reservoir without allowing air to escape.

The oil and air entering the nozzle must be under controlled flow rate and pressure to form desirable fuel mixtures. Presence of contaminating oil in the air and/or air in the oil stream entering the nozzle tend to make control of flow rate and pressure difficult. Contamination of either fluid with the other does not spoil atomization per se, but does affect steadiness of operation and tends to cause dribbling of liquid from the nozzle after shutdown. Further, the presence of gas in the liquid interferes with the effective and accurate metering of the liquid flow. Accordingly, it is apparent that the liquid-gas separation means is a vital component of any such system.

Heretofore, separation of oil from air in such systems has been primarily effected employing liquid-gas separation means as described above wherein float valve control means are employed in maintaining the desired level of oil in the oil reservoir. Unfortunately, it has been found that such liquid-gas separation means are far from satisfactory, with the deficiency in this type unit residing essentially in the use of the float valve control means. As indicated above, precise amounts of oil must be delivered from the liquid-gas separation means to the nozzle to form the desired fuel mixture. However, use of the float valve control means made it difficult to deliver a steady flow of oil to the nozzle. This is mainly due to the fact that the float portion of the float valve control means tends to bob as it floats in the oil reservoir, causing wide variations in the oil level as sensed by the float control means. Inasmuch as the oil flow from the reservoir to the nozzle and and rate of such flow is proportional to the level of oil in the reservoir, variations in oil level due to the bobbing of the float as sensed by the float valve control means can cause actual undesirable variation in oil flow.

In order to resolve this problem, it has been suggested to include a tiny orifice or restriction in the conduit leading from the oil reservoir of the liquid-gas separation means to the nozzle means. This would make flow rate of oil from the oil reservoir to the nozzle less dependent of the level of oil in the reservoir. Unfortunately, such restrictions or tiny orifices, usually about 0.02 inch in diameter tend, to become clogged thereby making it virtually impossible to accurately control the flow rate of oil from the oil reservoir to the nozzle means.

In yet another system, it has been suggested to employ a pump-compressor system including a fluid pressure responsive screen valve in the oil inlet line operatively associated with float valve control means in the oil reservoir of the liquid-gas separation means. The float is connected by a lever to a needle valve located above the oil level in the reservoir, which opens as the oil level rises in the oil reservoir, causing pressurized air to be discharged into the incoming oil line. When the float is low, the needle valve is closed, or partly closed so that little or no pressurized air is discharged into the incoming oil line, and the compressor portion of the pump is exerting enough suction to open the screen valve communicating with the oil inlet (leading from oil storage) to draw oil. As the level of oil in the oil reservoir rises, the needle valve opens more and more, discharging air into the oil pumping side of the compressor, reducing its ability to maintain a vacuum, and the screen valve closes thereby preventing fresh oil from storage to be limited to the system.

The problem with this type of a system is somewhat similar to other prior art systems employing float control valve mechanisms in the oil reservoir. In addition to being mechanically complex, the float tends to bob creating variations in the oil level so that the amount of pressurized air discharged into the incoming oil line is not an accurate indication of oil level in the reservoir. Thus, the inlet of fresh oil from storage is not being accurately controlled.

SUMMARY OF THE INVENTION

In accordance with the present invention, a system has been developed for regulating the level of fluid output of a pump wherein the means for accumulating the fluid output of the pump (i.e. the liquid-gas separation means in a fuel atomizing system) does not require the use of a float to control the proper input of fresh liquid into the pump in proportion to the amount of output liquid consumed in the system. When employed in association with liquid-gas separation means, the system hereof can supply liquid without entrained gas, such as oil free of air and gas free of liquid, such as air free of oil. Thus, the system of the invention is capable of supplying air and oil in controlled proportions, in atomized form or otherwise as fuel for oil furnaces, such as used in single and multiple-dwelling heating plants. Furthermore, the system of the invention makes use of the surprising fact that slight variations in the level of accumulated fluid output can have a large influence on fluid pressure of liquid being processed in the pump. Thus, and in accordance with the invention, relatively crude mechanical control means which need only be responsive to rather large fluid pressure variations can be employed to regulate the exact required flow of fresh liquid into the system.

Thus the instant invention comprises a system for regulating the level of output fluid of a pump which system can be employed for simultaneously compressing gas and pumping liquid (such as compressing air and pumping oil), and delivering metered amounts of air and oil. The system comprises primary pumping means for pumping fluid from a supply source, recycle pumping means for pumping accumulated output fluid, means for combining the fluid output of the primary pumping means and the recycle pumping means into a combined fluid output stream, means for accumulating combined fluid output stream, means for restricting said combined fluid output stream whereby pressure variations in the combined fluid output stream can be sensed, and fluid pressure responsive control means responsive to said pressure variations for regulating the proper flow of the combined fluid output stream to the means for accumulating the combined fluid output and primary pumping means.

Further, in accordance with the present invention, a gas-liquid atomizing system is provided which includes a system for regulating the level of output fluid of a pump as described above. Such atomizing system is particularly useful for atomizing fuel oil in air to form fuel mixtures for oil furnaces.

In the above systems, the primary pumping means and the recycle pumping means may comprise two separate and distinct pumps, the outputs of which are combined to form a combined fluid output stream. However, it is preferred that the primary pumping means and recycle pumping means, although essentially separate and distinct, be employed in a common housing comprising a rotary device or be employed in a combination pump-compressor for simultaneously compressing gas and pumping liquids of the type described in the Bellmer U.S. Pat. No. 3,565,550 or in copending application Ser. No. 161,166 filed July 9, 1971 by Aronson et al or other conventional rotary pumps or sliding vane rotary compressors heretofore known in the art.

In addition, and in accordance with the present invention, a method of regulating the fluid level of the output of a pump is provided, which comprises passing fluid under relatively low pressure, from a supply source, into the input side of a primary pumping portion of a pump; pumping the fluid under a relatively high pressure out of the output side of the primary pumping portion; accumulating output fluid from the pump; recycling a portion of accumulated output fluid back to a recycle pumping portion of the pump; combining recycled fluid from the recycle pumping portion and output fluid from the primary pumping portion to provide a combined fluid output stream; monitoring fluid pressure variations of the combined fluid output stream and diverting a portion of the combined fluid output stream back to the input side of the primary pumping portion of the pump in accordance with said fluid pressure variations, thereby controlling the level of combined fluid output accumulated.

The pressure variations sensed on the downstream side of the restricting means correspond to the variations of level of combined fluid output in the combined fluid output accumulation means as will be described hereinafter. The means for restricting the combined stream so that the pressure variations in the combined fluid output stream can be sensed generally comprise a fluid restricting orifice communicating with the means for combining the fluid output of the primary pumping means and the recycle pumping means.

For example, the means for combining the fluid output of the primary pumping means and the recycle pumping means into a combined fluid output stream can take the form of a common conduit means operatively associated with and communicating with the outputs of the primary pumping means and the recycle pumping means. The fluid-restricting orifice can be positioned in or made to communicate with the common conduits. Depending upon the density of the combined fluid output stream flowing across the fluid restricting orifice (in turn dependent on the accumulated liquid level) fluid pressure across the orifice will vary accordingly thereby actuating the fluid pressure responsive control means to divert a portion of the output of the pump back to the input side thereof thereby exactly regulating the accumulated output.

The fluid pressure responsive control means can take the form of any fluid pressure responsive valve. However, and in accordance with a primary feature of the invention, a relatively unsophisticated and rather crude mechanical control means, such as a pressure responsive poppet valve, can be employed. This is indeed surprising and unexpected inasmuch as the above-described systems are normally employed to deliver exactly metered amounts of fuel. The fact that relatively crude control means can be employed herein can be explained as follows. It has been found that relatively slight variations in the liquid level of combined fluid output accumulated in the accumulation means (which also functions as liquid-gas separation means when the invention is employed in a fuel atomizing arrangement) has a great influence on and creates large variations in fluid pressure across the fluid restricting orifice described above. Thus, even the relatively crude mechanical poppet valve will be actuated by the relatively large pressure variations in fluid flowing across the fluid restricting orifice even in the relatively sophisticated environment under discussion. The fact that the poppet valves can be employed herein as fluid pressure responsive control means is especially surprising inasmuch as these type valves were previously employed primarily for pressure release and safety valve functions and have never been employed for flow control purposes.

As will be seen hereinafter, particularly in conjunction with the discussion of the accompanying Figures, the by-pass diverting conduit, fluid restricting orifice and fluid pressure responsive control means all may be located either externally or internally with respect to the primary pumping means. Alternatively, the by-pass conduit may be located externally of the primary pumping means and the fluid restricting orifice and fluid pressure responsive means may be located in a common housing with the primary pumping means. In all embodiments of the present invention, the inlet ports to the primary pumping means and the recycle pumping means are distinct, although, if desired they may be included in a common housing.

The means for accumulating combined fluid output of the primary pumping means and recycle pumping means will usually be embodied in the liquid-gas separation means. The liquid-gas separation means will comprise an upper portion for separating liquid from gas, and a lower portion comprising a liquid-settling reservoir which includes accumulated liquid out-put conduit means, positioned at a pre-determined level in the reservoir, and communicating with the recycle pumping means. The accumulated liquid output conduit means will generally comprise an overflow pipe, sometimes referred to as a standpipe positioned at a predetermined level in the liquid settling reservoir, and recycle conduit means linking the overflow pipe with the recycle pumping means. However, in place of the overflow pipe, there can be provided a plurality of overflow pipes positioned at predetermined levels in the liquid reservoir to control flow from one or more of the overflow pipes out of the reservoir to the recycle pumping means. Alternatively, the accumulated liquid output conduit means can comprise recycle conduit means in communication with an orifice positioned at a predetermined level in the side of the liquid reservoir for regulating flow of liquid from the reservoir to the recycle pumping means.

Regardless of the arrangement, the function is the same. As the level of accumulated liquid rises above the top of the overflow pipe, less gas is entrained in the recycled fluid. Accordingly (1) the density and pressure of the recycled fluid is higher across the orifice in the pump; (2) the poppet valve opens; and (3) a greater percentage of the output of the pump is diverted back to the input and the level of fluid accumulated drops as the oil is consumed. When the level drops, air gets entrained in the recycled oil, thereby dropping the density and pressure to close the poppet and cause less diversion and more direct output for accumulation.

As will be seen hereinafter, where the pump employed in the present invention is of the Bellmer type, (that is, a pump designed to perform both pumping and compressing functions), the system of the invention may include several variations.

BRIEF DESCRIPTION OF THE FIGURES

The invention, as well as the advantages thereof, will be made apparent by the following description taken in conjunction with the accompanying drawings wherein.

DETAILED DESCRIPTION OF THE INVENTION

Figure 1:
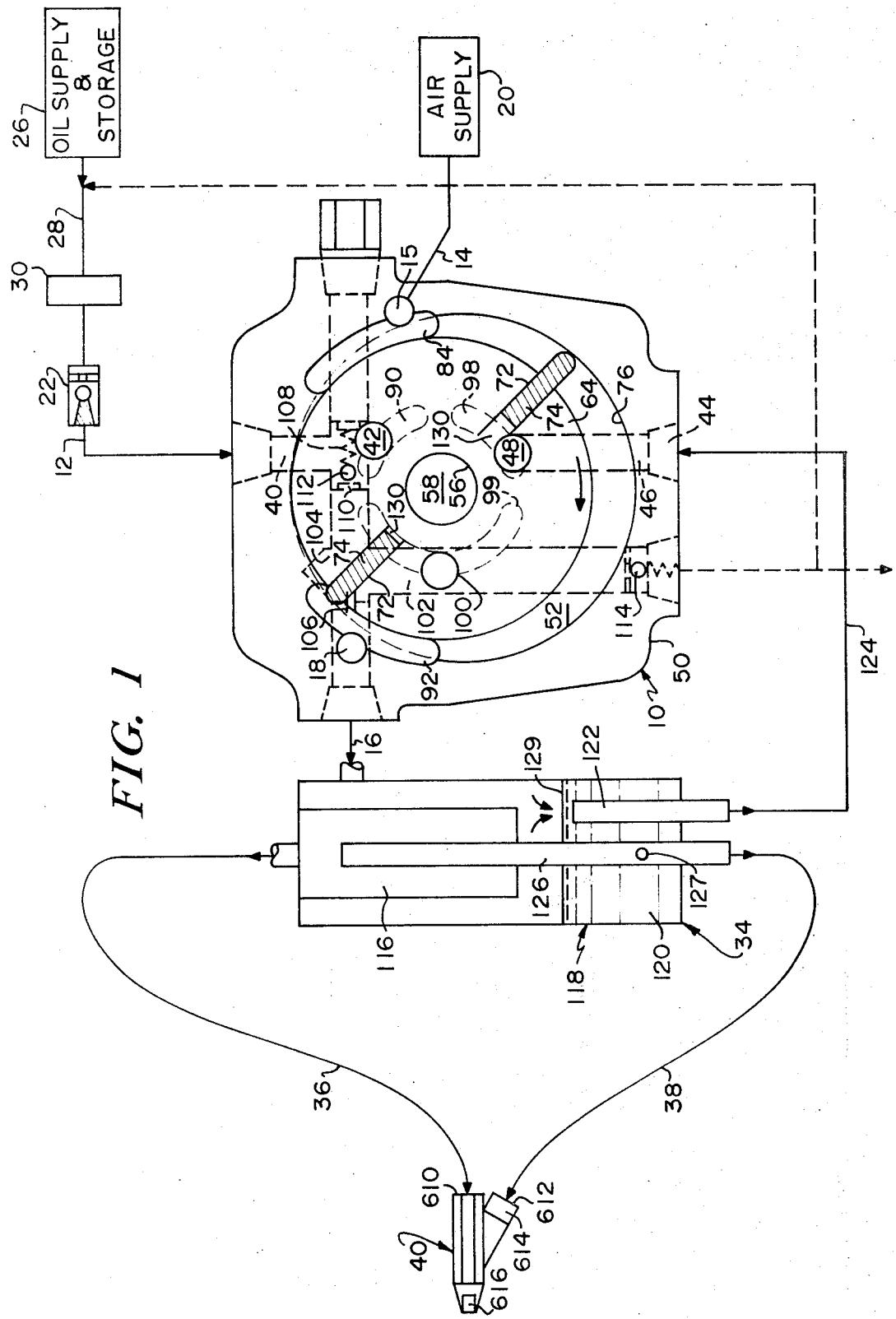
FIG. 1 is a semi-schematic diagram of a system for regulating level of fluid output of a pump, in accordance with the invention.

Referring now to the accompanying Figures, FIG. 1 shows a system for controlling liquid level of output of a pump-compressor unit of the invention, particularly adapted for supplying atomizing air and oil to an oil combustion system. This system includes a pump-compressor unit generally referred to by the numeral 10 having an oil inlet conduit 12, air inlet conduit 14, air inlet port 15, oil plus air outlet conduit 16, and, air outlet port 18. Air inlet conduit 14 is linked to the air supply source 20, and may include an air filter (not shown). Oil inlet conduit 12 is linked to oil supply and storage 26 through oil conduit 28 which includes oil filter means 30 and a one way check valve 22. Outlet conduit 16 for oil and air is in communication with liquid-gas separation means (means for accumulating combined fluid output stream) generally referred to by the numeral 34. Oil-free air conduit line 36 and air-free oil conduit line 38 lead from liquid-gas separation means 34 to air-oil atomizing means generally referred to by the numeral 140.

The pump-compressor unit 10 comprises a pump-compressor body 50 having a cylindrical pumping chamber 52 formed therein, a first end plate (not shown) having a bore therethrough for receiving rotatable shaft 58, and a second closure or face plate (not shown) operatively associated with the other end of saidy body 50. The shaft 58 extends from a driver such as an electric motor through the bore in the first end plate and into pumping chamber 52 formed in body 50, and a slotted rotor 64 is disposed about the shaft 58 for rotation therewith in chamber 52. The rotor means 64 is mounted on shaft 58 and is eccentrically disposed with the pumping chamber 52.

As seen in FIG. 1, rotor 64 has a plurality of spaced slots 72 formed therein dimensioned to slidably receive fluid moving means or vanes 74. As noted, the horizontal center line of shaft 58 is off-set vertically from the horizontal center line of body 50 and chamber 52 thereby allowing the rotor 64 to rotate eccentrically with respect to the body 50 and pumping chamber 52. Thus, the interior surface or walls 76 of pumping chamber 52 act as a cam surface upon rotation of rotor 64, forcing vanes 74 into slots 72 during 180° of rotation. During the other 180° of rotation, the vanes 74 are, due to centrifugal force, partially ejected from slots 72 which at the rear portions thereof function as pumping chambers for the liquid being pumped as will be more fully described below.

Formed within one of the face plates are two arcuate grooves 84 and 92 and formed within the same or other face plate are three arcuate grooves 90, 98 and 99.

The unit of FIG. 1 includes primary pumping means for pumping fluid from the oil supply and comprises oil inlet conduit 40 of oil inlet port 42 which communicates with arcuate groove 90 and the vanes to be further discussed; and recycle pumping means including, accumulated combined fluid recycle inlet 44, recycle inlet conduit 46, recycle inlet port 48 which communicates with arcuate groove 98 and the vanes. Common discharge groove 99 communicates with port 100. The means for combining the fluid output of the primary pumping means and the recycle pumping means into a combined fluid output stream includes groove 99, discharge port 100 as well as conduit 102 communicating with discharge port 100.

Gas inlet groove 84, in addition to communicating with gas inlet port 15, also communicates with pump chamber 52 such that upon rotation of rotor 64, and as vanes 74 pass over gas inlet port 15, gas will be drawn into groove 84 and swept into pump chamber 52 for approximately 180° of rotor rotation. Thereafter, when trapped between successive vanes forming a decreasing volume, the gas is compressed and delivered to gas outlet groove 92 (which also communicates with pump chamber 52), and is thus discharged through gas outlet port 18.

The means for restricting the combined stream such that pressure variations in the combined fluid output stream can be utilized includes fluid restricting orifice 106. The fluid pressure responsive control means include poppet valve means generally referred to by the numeral 108 which includes valve seat 110 and the spring biased ball 112. The diverting bypass conduit is referred to by numeral 104. Conduit 102 may also include safety relief valve 114. In the event of undesirable pressure build-up in the conduit 102, valve 114 will open to release oil which may be recycled back to oil supply.

The liquid-gas separator means 34 includes an upper portion 116 and a lower portion generally referred to by the numeral 118, which includes an oil reservoir 120 containing overflow pipe 122 which is linked to the recycle inlet 44 for recycle pumping via recycle conduit 124. Pipe 126 containing submerged weir orifice 127 links the reservoir to the oil conduit line 38.

A description of the operation of the system illustrated in FIG. 1 described above, follows.

Air from air supply 20 enters conduit 14, which may be in the form of an inverted tube. Air is drawn in through air inlet port 15 into air inlet groove 84 and swept into pumping chamber 52. As rotor 64 continues to rotate a gradually enlarging space is formed by the action of the sliding vanes 74, moving out by centrifugal force to contact the wall 76, of the pump chamber 52. As this suction volume increases gas continues to flow in through gas inlet port 15 to the gas inlet groove 84. Then when the vanes 74, passes the point of maximum extension, the trapped volume decreases (raising the pressure of the air) and the compressed air is delivered to gas discharge groove 92. The location and dimensions of the gas grooves 84 and 92, and the number of vanes can be varied to give the desired built-in compression ratio.

The gas (air) flows from gas discharge groove 92 into the discharge port 18 and then flows together with the liquid (oil) into the upper portion of the gas-liquid separating means 34.

Oil from oil storage 26 is drawn through conduit 28, oil filter 30, check valve 22, oil inlet conduit 12, oil inlet conduit 40, oil inlet port 42, oil inlet groove 90 of the primary pumping means and finally into the cavities 130 formed in the rotor 64 by the outward movement of the vanes. Upon rotation of the rotor, and as vanes 74 are projected out of slots 72, the volume of cavities 130 initially increases and is filled with the liquid to be pumped. With further rotation, and after the vanes have passed "over center", the cavities begin to decrease in volume and the liquid is pumped into common liquid outlet groove 99 and discharged out through common liquid outlet port 100. The recycle pumping function is similar except that the input is port 48.

The oil is discharged from discharge port 100 via conduit 102 and orifice 106 and combined with the air into outlet conduit 6 and into the liquid-gas separation means 34. The oil entering separation means 34 drops to the lower portion or reservoir portion 118 thereof, while air still rises to the upper portion 116 for cleansing thereby. As the level of oil collected in the reservoir 120 rises above the overflow pipe 122, oil plus some air (the amount of air depending on the level of the oil above the top of the pipe) flows through the overflow pipe 122 via recycle conduit 124 into the fluid recycle inlet 44, recycle conduit 46 to inlet port 48 and groove 98 for recycle pumping by the vanes 76 which expel the combined fluid of primary and recycle stream into groove 99 and thence to the common discharge 100. The combined fluid output stream so-formed flows into conduit 102 and across and through fluid restricting orifice 106. Depending upon the back up pressure of the combined fluid output stream (which is dependent upon the density of the fluid which is proportional to the level of oil in reservoir 120) the flow control valve 108 may be actuated. If the back up pressure is higher than a predetermined pressure, the ball 112 will unseat from the valve seat 110 and combined fluid output stream under pressure will divert back through diversionary conduit 104 to the inlet port 42 of the primary pumping means, thus reducing by the same amount, the amount of oil drawn from the supply 26.

Thus, in effect, what is occurring is that a lesser portion of the combined fluid output stream is flowing into the liquid-gas separation means, and the remainder is diverted back to the primary pumping means inlet with a corresponding decrease in new draw oil. Thus, with oil being consumed by the nozzle 40, the level of oil accumulated in the reservoir gradually decreases.

When this occurs, the oil flowing into the overflow pipe 122 will contain larger amounts of air and, therefore, be less dense. The less dense oil flowing through overflow pipe 122 and recycled causes the pressure to drop across orifice 106 allowing the ball 112 of the control valve 108 to seat. Under these conditions, no fluid is diverted back to pump input and all the combined fluid output stream passes through the orifice 106 and into the separation means 34 thereby building up the level of accumulated liquid. The system continues to oscillate with the desired level in the reservoir automatically maintained.

Oil flow to the air atomizing nozzle 140, is controlled by means of submerged weir orifice 127 in tube 126, so that the flow rate is essentially independent of the pressure conditions existing in nozzle 140 as regards the zone where the air and oil streams meet. Tube 126 is open at the top in an area where the air is oil free so that all oil going to the nozzle must be limited to that which flows through orifice 127. The difference in elevation between the free surface of the liquid, shown as 129, and the orifice 127 provides the force to drive liquid through the orifice, regardless of the total pressure in separator 34 or the pressure in nozzle 140. Connecting tube 38 carries a mixture of oil and air to the nozzle. In order to keep the proportion of air small, the diameter of tube 38 is kept small. The flow of oil can be varied by varying the relative positions of orifice 127 and overflow tube 122.

Figure 2:
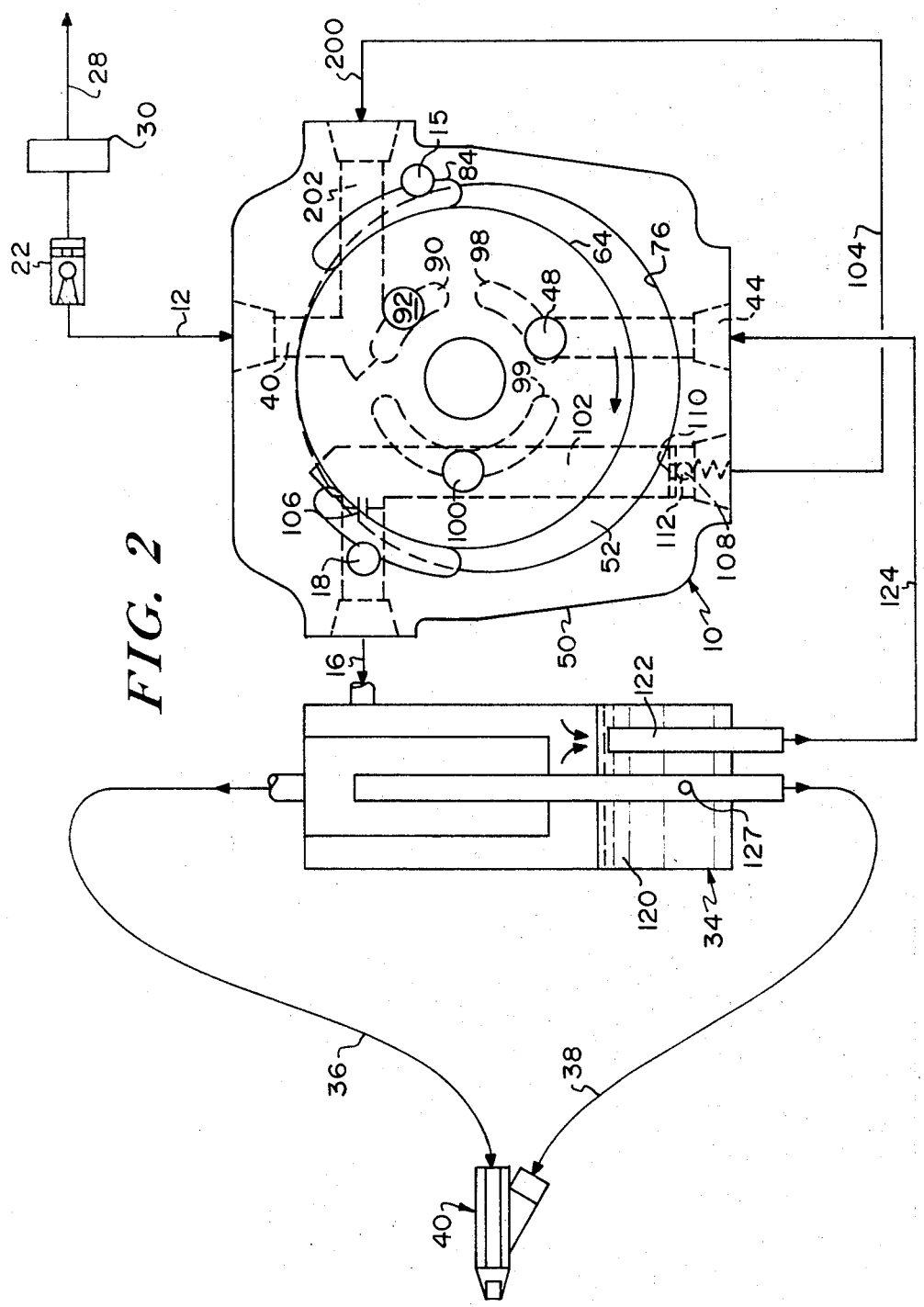
FIG. 2 is a semi-schematic diagram of an alternative embodiment of the instant invention wherein a portion of the means for regulating the flow of fresh input oil into the pump and flow of fluid to the accumulation means, is located externally of the pump.

The system illustrated in FIG. 2 is essentially the same as that of FIG. 1 with the exception that the diversionary bypass conduit 104 is now positioned externally to the pump and in communication with the control valve 108 and "divert" oil inlet 200, which communicates with conduit 202 which in turn communicates with inlet port 92 of groove 90 of the prime pumping means. In this embodiment, conduit 102 communicates with the fluid restricting orifice 106 and the control valve 108.

Operation of the system illustrated in FIG. 2 is the same as that described in FIG. 1, except that the amount of oil diverted is regulated by poppet valve 108 through external diversionary conduit 104.

Figure 3:
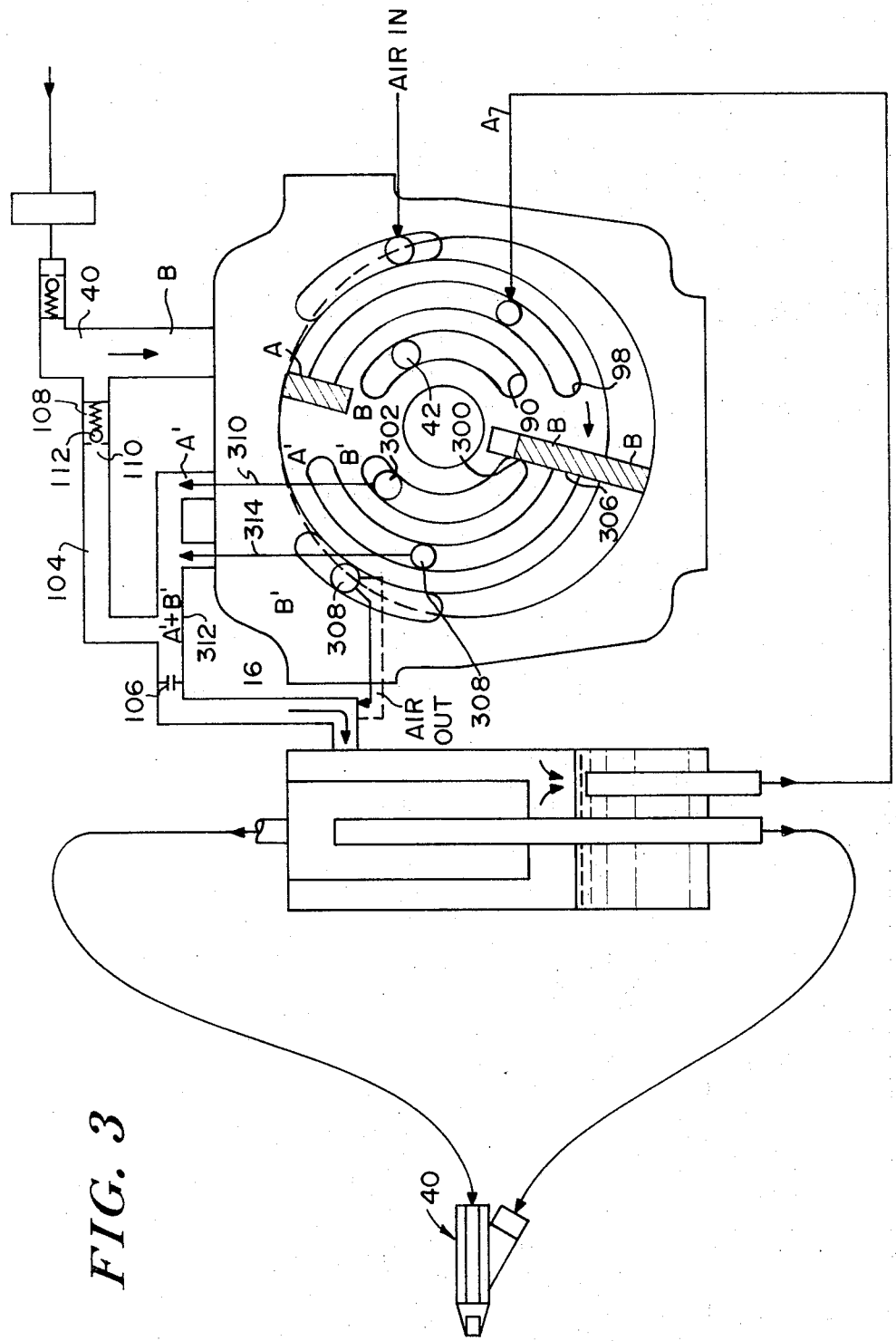
FIG. 3 illustrates a semi-schematic diagram of a system similar to that shown in FIG. 1 employing an alternative embodiment of the pump and wherein the means for regulating the level of fluid output of the pump are located externally to the pump.

The embodiment illustrated in FIG. 3 is essentially the same as those described previously with the following exceptions. In the FIG. 3 embodiment, grooves 90 and 98, for primary fluid pumping and recycle pumping functions respectively, are at different radii in the face plate of the pump. Furthermore, a separate discharge groove 300 and port 302 are provided for the output of the primary pumping means, and separate discharge groove 306 and discharge port 308 are provided for the output of the recycle pumping means. Furthermore, the vanes A and B and associated slots are of different lengths in the rotor such that vanes A and their associated slots pump only from groove 98 to groove 306, and vanes B and associated slots pump only from groove 90 to groove 300. In addition, the means for restricting the combined stream (the orifice 106); the control means responsive to fluid pressure (poppet valve 108); and the diversion path 104 are located externally to the pump. Thus, discharge port 302 for the primary pumping means is linked via conduit 310 to common conduit 312 and the discharge port 308 for the recycle pumping means is linked via conduit 314 to common conduit 312. Fluid restricting orifice 106 is lodged in the conduit 312 and bypass conduit 104 links the common conduit 312 to the oil inlet conduit 40. The operation of this embodiment (FIG. 3) is the same as those described hereinbefore.

Fluid output from discharge ports 302 and 308 are passed via conduits 310 and 314, respectively, into common conduit 312 and across fluid restricting orifice 106 and into bypass conduit 104. Depending upon the fluid pressure exerted across the fluid restricting orifice 106 (dependent upon density in turn dependent on the amount of air recycled, in turn dependent on level), the flow control valve 108 is made to open or close so that a portion of the combined fluid output will be diverted to oil inlet conduit 40, thereby regulating fresh oil flowing into the primary pumping means.

Figure 4:
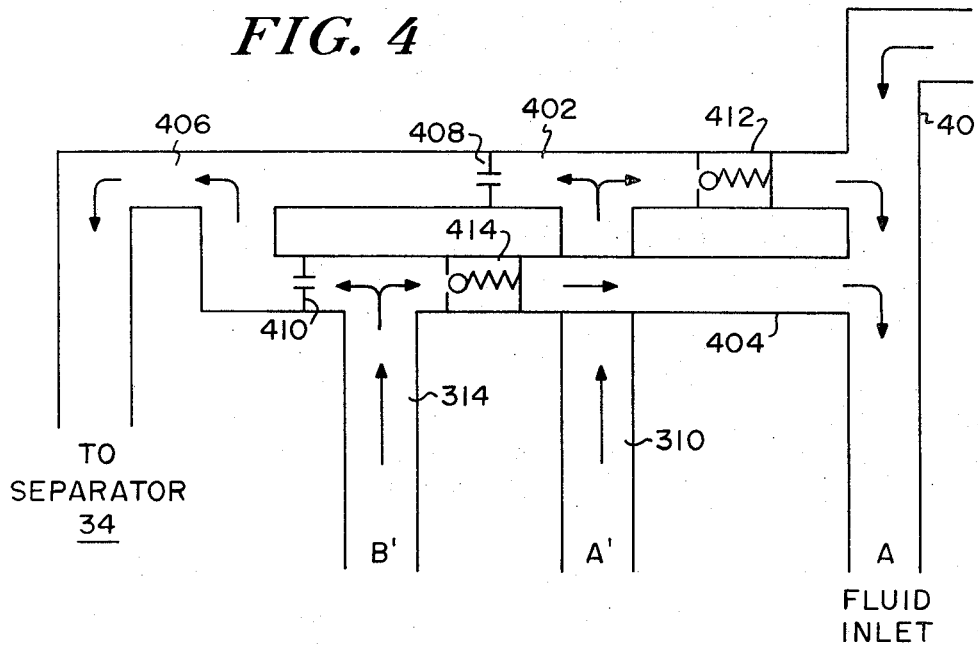
FIG. 4 is a semi-schematic diagram of another form of means for regulating the level of fluid output of a pump which can be employed in conjunction with any of the pump systems described herein.

FIG. 4 illustrates alternate means for regulating level of the fluid in the separation means 34 of FIG. 3. The conduits, fluid restricting orifices and valves shown in FIG. 4 are to be used in place of the conduits 312 and 104, fluid restricting orifice 106 and valve 110. In FIG. 4, conduit 310 leading from the discharge port 302 of the primary pumping means, as shown in FIG. 3, communicates with conduit 402 and the conduit 314 links the discharge port 308 of the recycle pumping means, as shown in FIG. 3, to conduit 404. The diversionary conduits 402 and 404 communicate with the common conduit 406 (which is equivalent to conduit 16 in FIGS. 1 to 3) and to oil inlet conduit 40 which communicates with the inlet port 42 of the primary pumping means. Conduits 402 and 404 include fluid restricting orifices 408 and 410, respectively, and flow control valves 412 and 414, respectively.

The operation of this embodiment is essentially the same as that of FIG. 3. Depending upon the fluid pressures of the output of the primary pumping means flowing in conduit 310 and the output of the recycle pumping means flowing in conduit 314, the valves 412 and 414, respectively, can be opened thereby diverting a portion of the outputs of these pumping means back to the oil inlet conduit 40.

Figure 5:
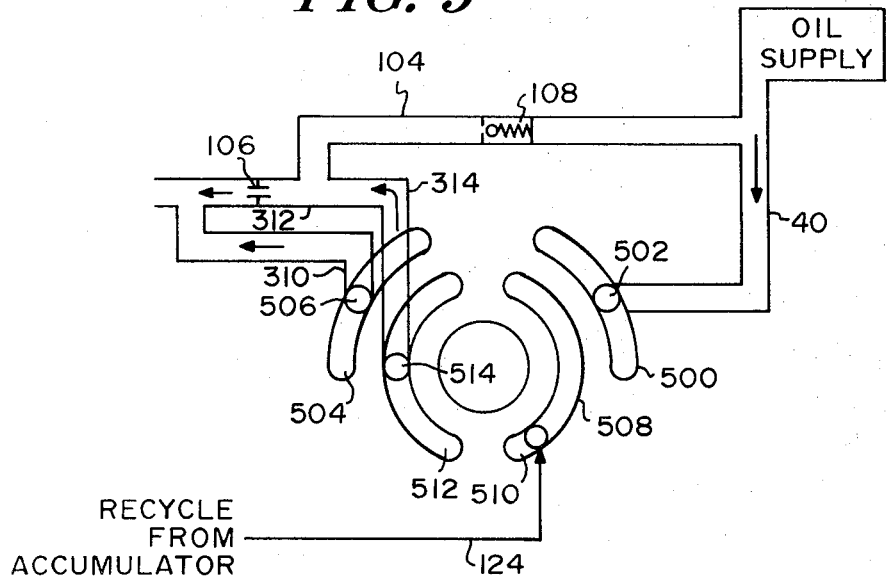
FIGS. 5 to 7 are semi-schematic representations of portions of various embodiments of systems for regulating the level of fluid output of a pump, in accordance with the present invention.

FIG. 5 is a schematic representation of a portion of a system in accordance with the present invention wherein oil from the oil supply and storage is pumped by the compressor portion of the pump of FIG. 1 acting as a vacuum pump, and the recycled oil is pumped by vane action. This system includes primary pumping means including a first arcuate groove 500 operatively associated with oil inlet port 502 which communicates with oil supply via conduit 40, said groove 500 communicating with the compression space between the rotor 64 (not shown) and pumping chamber walls 76. Outlet arcuate groove 502 communicates with the compression space between the rotor and walls of the pumping chamber and communicates with outlet port 506.

In this embodiment, the reciprocating motion of the vanes is used to recycle oil. Thus, there is provided a groove 508 and recycle inlet port 510 which communicates with recycle conduit 124 leading from the overflow pipe 122 of the separation means 34. This portion of the recycle pumping means is operatively associated with discharge groove 512 and corresponding discharge port 514 for recycle pumping means output. Recycle discharge port 514 communicates with common conduit 312 via conduit 314 and the primary pumping means discharge port 506 communicates with common conduit 312 via conduit 310. Common conduit 312 which leads to conduit 16 and the separation means 34 includes fluid restricting orifice 106 and bypass conduit 104 which includes flow control valve 108. Operation of the embodiment of FIG. 5 is essentially as described with respect to the embodiment of FIG. 3 with the valve 108 regulating the feed back in accordance with the density of recycled oil in turn dependent on the level accumulated in reservoir 120.

Figure 6:
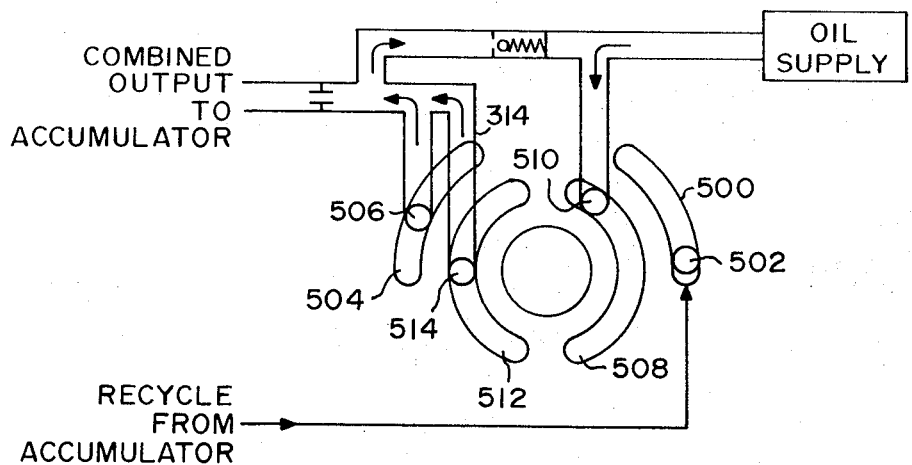

The embodiment shown in FIG. 6 is essentially the same as that shown in FIG. 5, except reversed. That is, oil from the oil supply (the primary oil) is pumped by vane action (that is, via grooves 508 and 512 to conduit 314 of FIG. 6) and, recycled oil is pumped by what was previously (in FIG. 1) the compressor (that is, the space between the rotor and walls of the pumping chamber), acting as a combined compressor and oil pump.

Figure 7:
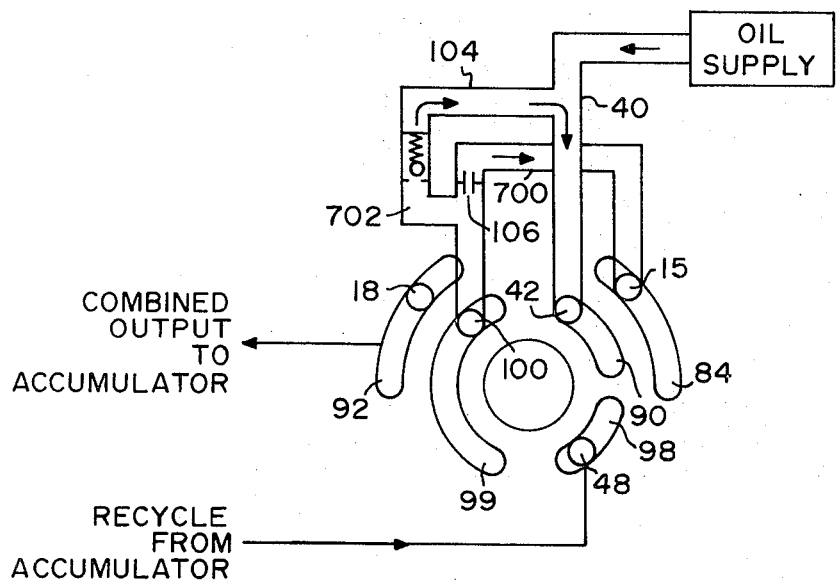

The embodiment shown in FIG. 7 is essentially the same as that shown in FIG. 1, with the exception that combined output oil from discharge port 100 is discharged by conduit 700 into the compressor suction. Groove 84 communicates with the compression space between the rotor 64 and walls of the pumping chamber. The combined fluit output stream from groove 84 is compressed and passed to groove 92 of FIG. 1 and into outlet port 18 and on to the separation means 34 via conduit 16. In reality, the extra step accomplished by the embodiment of FIG. 7 has the effect of creating a two stage pump.

The embodiment of FIG. 7 operates as follows. Output from primary pumping means and recycle pumping means described with reference to FIG. 1 is pumped via vane action to discharge groove 99 and discharge outlet port 100. Combined output fluid from outlet port 100 is made to flow into conduit 700 and conduit 702 which communicates with bypass conduit 104. Where the fluid pressure of the combined output fluid from discharge 100 is below a predetermined level, it will not be able to open valve 108, and all oil will flow back to inlet port 15 of groove 84 to be further pumped. Combined fluid from groove 84 will be then passed onto discharge groove 92 and outlet port 18 to the separation means 34. However, if the combined outlet fluid from output discharge 100 is at above a predetermined pressure, control valve 110 will open so that a portion of combined output fluid will be diverted to the input side of the pump.

As indicated previously, the system of the invention represents a broad advance and a significant improvement over prior art systems employed for delivering atomized oil in air. One of the significant improvements resides in the fact that the present invention does not employ a float type control valve in the oil-air separation means to control the level of accumulated oil. As noted previously, such prior art systems caused the liquid level to vary greatly such that a very small opening (in the magnitude of 0.02'') from the tank to the nozzle was employed to make the rate of oil from the nozzle independent of level. As indicated previously, this produced a clogging problem. In the present invention, on the other hand, the orifice 127 communicating with the nozzle can be upwards of about 0.06 inch in diameter and thus there is no problem of clogging of the orifice or lines leading to the nozzle.

In place of the standpipe overflow control, a simple opening in the side of the separator can be employed. Alternatively a vertically adjustably standpipe can be employed, in which case the accumulated level can be selectively varied.

The liquid-gas (oil-air) separation means 34 employed in the invention as shown in the Figures may take the form of any conventional liquid-gas separators as known in the art. The oil-air separator 34 shown in the Figures is particularly preferred and comprises an upper portion 116 and a lower portion 118. The upper portion of the separator 34 preferably comprises a section containing a high surface area packing material. The lower section includes the oil reservoir as seen hereinbefore. Transformation of the contaminated fluid streams entering separator 34 into respectively pure streams of air and oil is effected as follows. Oil is removed from the air as it (air) flows upward through the packed section of the air-oil separator 34. The packing material contacts the oil mist or droplets dispersed with and/or entrained in the air causing the mist or droplets to coalesce into relatively large droplets which fall into the lower section. Air escapes from the oil as the oil is allowed to settle quietly in the lower section.

Examples of packing materials which can be employed in the air-oil separation means includes porcelain, stoneware, carbon or metal Raschig rings, ceramic Berl saddles, tiles, ceramic grids, spiral rings, partition rings, aluminum rings or spirals, Pyrm rings, steel rings or spirals, Stedman packing, McMahon packing, wire helixes or any other high surface area packing material known in the art.

Other gas-liquid separation appratus which may be employed herein includes impact or impingement separators where staggered plated wires, cables, rods, and other shapes are inserted in gas ducts, as well as electrostatic separators and batt filters, all of which separators would include a liquid reservoir and overflow pipe or standpipe means as described hereinbefore.

The atomizing means 140 shown in the Figures includes an air or gas inlet 610, an oil or liquid inlet 612, the oil inlet including filter means 614 and resonator 616. Other suitable air atomizing nozzles may be employed.

The atomizing means employed herein should deliver atomizing air and oil in any desired proportions. Effective control of the desired proportions is maintained by judiciously supplying oil-free air and air-free oil to the atomizing means at required flow rates. The flow rates can be controlled by adjusting operation of the separator means as well as the flow rates of air and oil entering and leaving the pump-compressor unit.

It is to be understood that the fluid handling system shown in the Figures represent preferred embodiments. Other embodiments encompassed by the present invention include the following: those employing air-oil separation means and atomizing means other than that illustrated; those where separate pumps for primary and recycle pumping functions are employed. Furthermore, the drive or motor employed in the pump-compressor unit of the invention may be made double-ended to drive a combustion air blower.

The number of fluid moving means or vanes employed in the pump-compressor unit may be varied from two to three to four or more depending upon the working pressures employed and the arrangements of parts and grooves in the pump.

Systems of the invention including those illustrated in the accompanying Figures are particularly suited for supplying atomizing air and fuel oil to oil furnaces, such as used in single and multiple dwelling heating plants. These normally operate on a start-stop basis, for which the system here disclosed is particularly suited. However, these systems may be adapted for other applications requiring a gas-free liquid and a liquid-free gas; also the required pump-compressor combination may be employed in a system wherein a pumped lubricant is not required beyond the pump-compressor itself. Moreover, it will be appreciated that the liquid level control system hereof may be employed in any environment where it is desired to maintain a desired level of output of a pump.

Moreover it will be appreciated that if desired, the pressure variations experienced across the orifice (resulting from the variations in density due to level of liquid) can be used to directly actuate suitable flow control device to cause primary flow to vary and thereby maintains a desired liquid level. This differs slightly from the embodiments hereinabove discussed where the pressure variations indirectly vary the primary flow by the interaction of the primary and recycle flow.

Although this invention has been described with respect to its preferred embodiments, it should be understood that many variations and modifications will now be obvious to those skilled in the art, and it is preferred, therefore, that the scope of the invention be limited, not by the specific disclosure herein, but only by the appended claims.

I claim:

1. A liquid flow system for producing a regulated liquid flow comprising a liquid reservoir having an inlet, a liquid level control outlet and a liquid supply outlet disposed below said control outlet, means including a pressure responsive flow control for feeding liquid to said reservoir inlet to fill said reservoir to a level at least as high as said control outlet, means for maintaining a gas in the remainder of said reservoir, means for effecting the flow of liquid and gas, which comprises a twophase fluid, from said control outlet and producing fluid pressure corresponding to the relative quantities of liquid and gas entering said control outlet and means coupling the last means to said pressure responsive flow control to modify the rate of liquid flow to the first said means in accordance with the density of said fluid and thereby maintaining a substantially uniform liquid level in said reservoir.

2. A liquid flow system according to claim 1 wherein said means for feeding a liquid to said reservoir includes a conduit and a pressure relief valve coupled thereto, said means for effecting flow of liquid and gas includes pumping means having an outlet and the last said means includes a second conduit coupling the last said outlet to the first said conduit.

3. A liquid flow system according to claim 1 wherein said feeding means comprises a pump having inlet means and outlet means, means coupling said inlet means to a liquid supply, means coupling said outlet means to the inlet of said reservoir, means restricting the liquid flow from said pump to cause a liquid pressure to be developed in said outlet means, and said means for effecting flow of liquid and gas from said control outlet includes a conduit coupling the last said outlet to said inlet means.

4. A liquid flow system according to claim 3 wherein said inlet means on said pump comprises individual inlets connected to said liquid supply and said control outlet and means for successively admitting liquid to each inlet.

5. A liquid flow system according to claim 4 wherein said pump includes means for compressing a gas and delivering compressed gas to said outlet means.

6. A liquid flow system according to claim 5 wherein said reservoir is closed and has a gas outlet communicating therewith at a level above the level of the liquid.

7. A liquid flow system according to claim 5 wherein said pump is a rotary, vane-type pump having a circular cavity, a circular rotor eccentrically positioned in said cavity and having a plurality of radial slots with vanes slidably disposed therein, and gas and liquid inlet and outlet means communicating with the space between the rotor and the cavity wall and the spaces between the inner ends of the vanes and the bases of said slots.

8. A liquid flow system ccording to claim 7 wherein a gas inlet and a gas outlet communicate with the first said space and a liquid inlet and a liquid outlet communicate with the last said spaces.

9. A liquid flow system according to claim 7 wherein said rotor includes slots of at least two different depths, vanes of at least two different depths slidably engaging said slots and an inlet and an outlet communicating with the spaces between the vanes of one depth and the bases of the associated slots, and an inlet and an outlet communicating with the spaces between the vanes of the other depth and the bases of the associated slots.

10. A liquid flow system according to claim 7 wherein said gas inlet and outlet means communicate with the first said space and said liquid inlet and outlet means comprise at least individual inlets and at least one outlet communicating with the second said spaces and liquid is admitted successively to the last said inlets.

11. A liquid flow system according to claim 3 wherein said pump includes a pressure relief valve communicating with said pump outlet.

12. A liquid flow system for producing a regulated liquid flow comprising a liquid reservoir having an inlet, a liquid level control outlet and a liquid supply outlet disposed below said control outlet, means including a pressure responsive flow control for feeding liquid to said reservoir inlet to fill said reservoir to a level at least as high as said control outlet, means for maintaining a gas in the remainder of said reservoir, means for effecting the flow of liquid and gas from said control outlet and producing fluid pressure corresponding to the relative quantities of liquid and gas entering said control outlet and means coupling the last said means to said pressure responsive flow control to modify the rate of liquid flow to said reservoir, said feeding means comprising a pump having inlet means and outlet means, means coupling said inlet means to a liquid supply, means coupling said outlet means to the inlet of said reservoir, means restricting the liquid flow from said pump to cause a liquid pressure to be developed in said outlet means, and said means for effecting flow of liquid and gas from said control outlet includes a conduit coupling the last said outlet to said inlet means, said pump further including a pressure relief valve coupling said pump outlet with said pump inlet.

13. A liquid flow system according to claim 3 wherein said pump is a rotary, vane-type pump having a circular cavity, a circular rotor eccentrically positioned in said cavity and having a plurality of radial slots with vanes slidably disposed therien, and liquid inlet and outlet means communicating with the space between the rotor and the cavity wall and the spaces between the inner end of the vanes and the bases of said slots and wherein the liquid to be pumped is fed to the inlet communicating with the first said space and the outlet of the first said space is coupled to the inlet to said second spaces.

* * * * *